United States Patent [19]

Gardner et al.

[11] Patent Number: 4,715,400

[45] Date of Patent: * Dec. 29, 1987

[54] VALVE AND METHOD OF MAKING SAME

[75] Inventors: John F. Gardner, Loveland; Thomas W. Showalter, Milford, both of Ohio

[73] Assignee: Xomox Corporation, Cincinnati, Ohio

[*] Notice: The portion of the term of this patent subsequent to Dec. 24, 2002 has been disclaimed.

[21] Appl. No.: 812,231

[22] Filed: Dec. 23, 1985

Related U.S. Application Data

[62] Division of Ser. No. 473,555, Mar. 9, 1983, Pat. No. 4,559,967.

[51] Int. Cl.$^4$ .................. F16K 49/00; F16K 1/22
[52] U.S. Cl. ................... 137/341; 137/340; 251/308
[58] Field of Search ............... 137/340, 341; 251/305, 251/308

[56] References Cited

U.S. PATENT DOCUMENTS

| | | | |
|---|---|---|---|
| 3,028,874 | 4/1962 | Burkett | 137/340 |
| 3,580,267 | 5/1971 | Baker | 137/341 |
| 4,161,959 | 7/1979 | Jansen et al. | 137/340 |
| 4,353,388 | 10/1982 | Isoyama et al. | 137/340 |
| 4,380,246 | 4/1983 | Casale et al. | 137/340 |
| 4,392,509 | 7/1983 | Siddall | 137/340 |
| 4,402,337 | 9/1983 | Schuurman | 137/341 |
| 4,559,967 | 12/1985 | Gardner et al. | 137/340 |

Primary Examiner—A. Michael Chambers
Attorney, Agent, or Firm—Kinney & Schenk

[57] ABSTRACT

A fluid control valve and method of making same are provided wherein such valve comprises a valve body structure having a fluid flow passage therethrough and a first sealing surface and a closure structure for controlling fluid flow through the passage with the closure structure having a second sealing surface adapted to engage the first sealing surface to shut off fluid flow through the valve and wherein such valves comprises a substantially annular heat exchange device comprising at least one of the structures and being disposed immediately adjacent the sealing surface thereof for controlling the temperature of at least one of the sealing surfaces.

9 Claims, 13 Drawing Figures

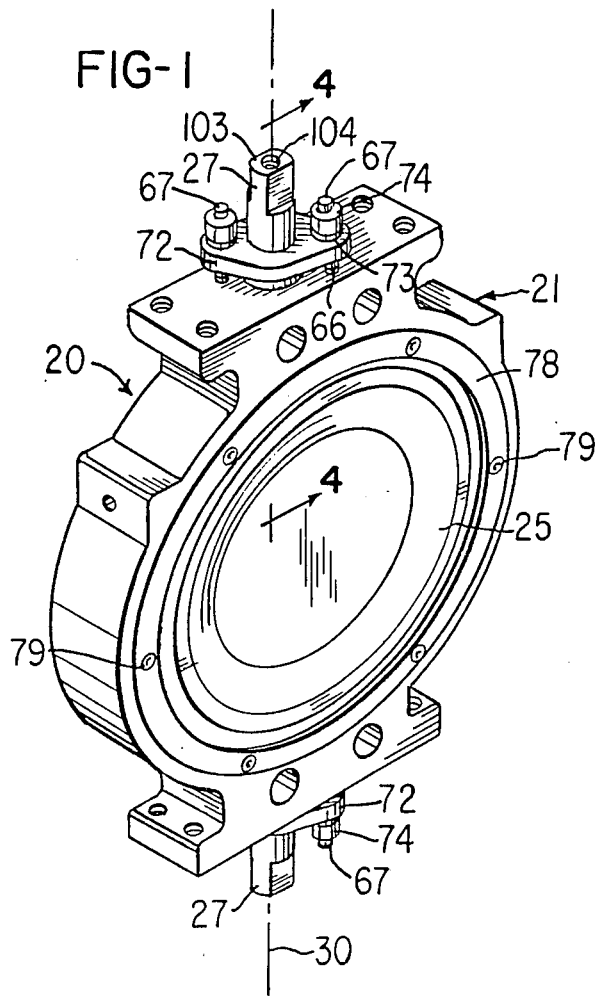
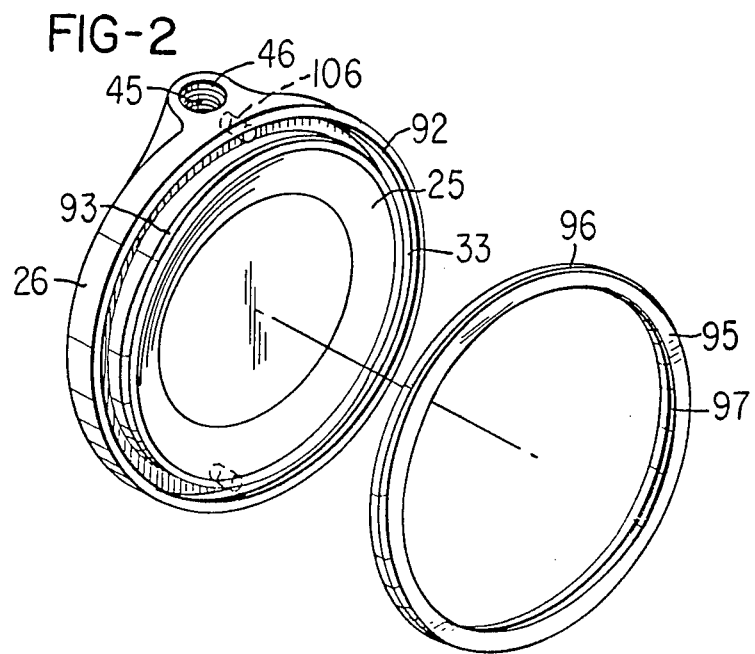

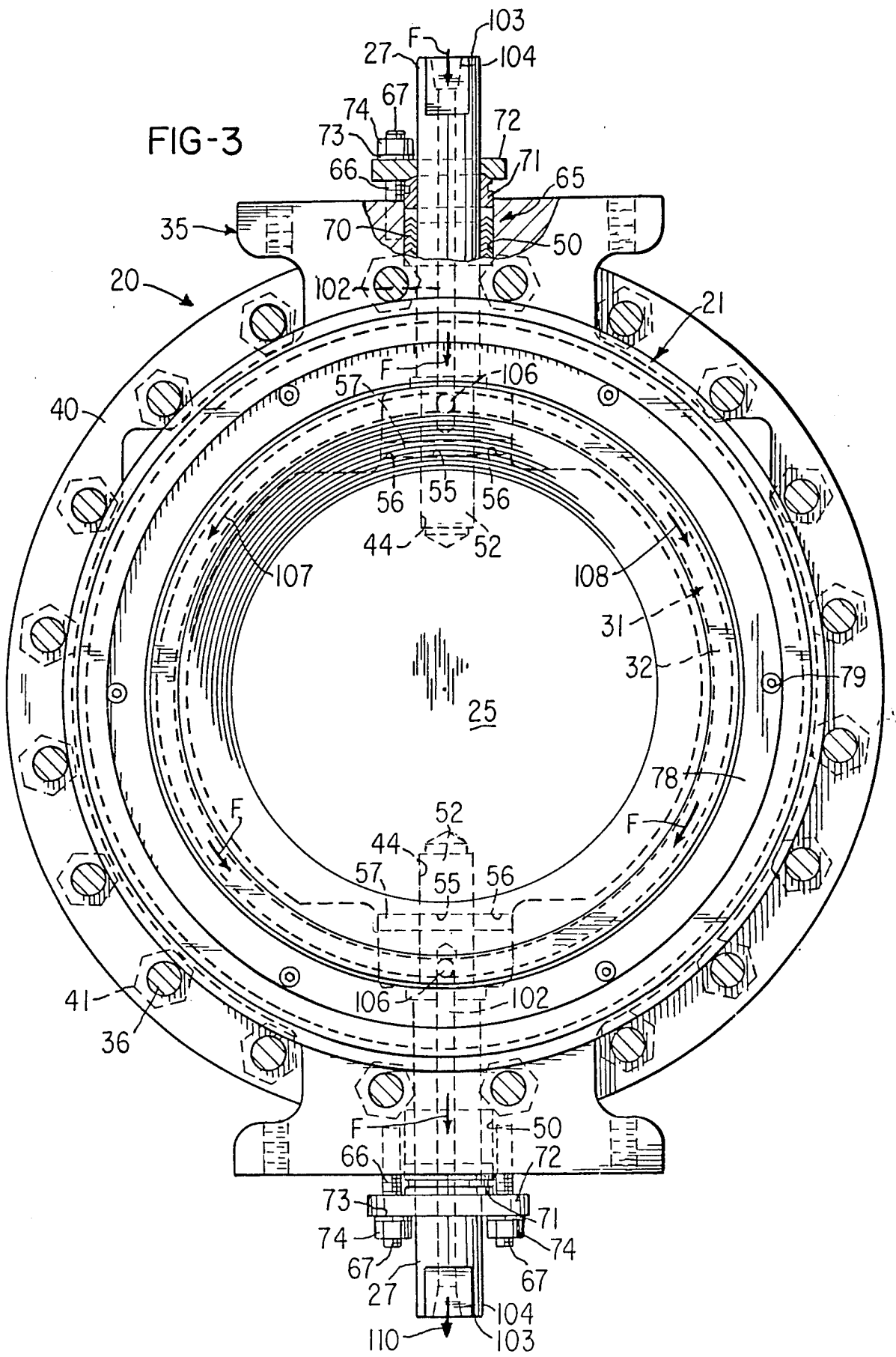

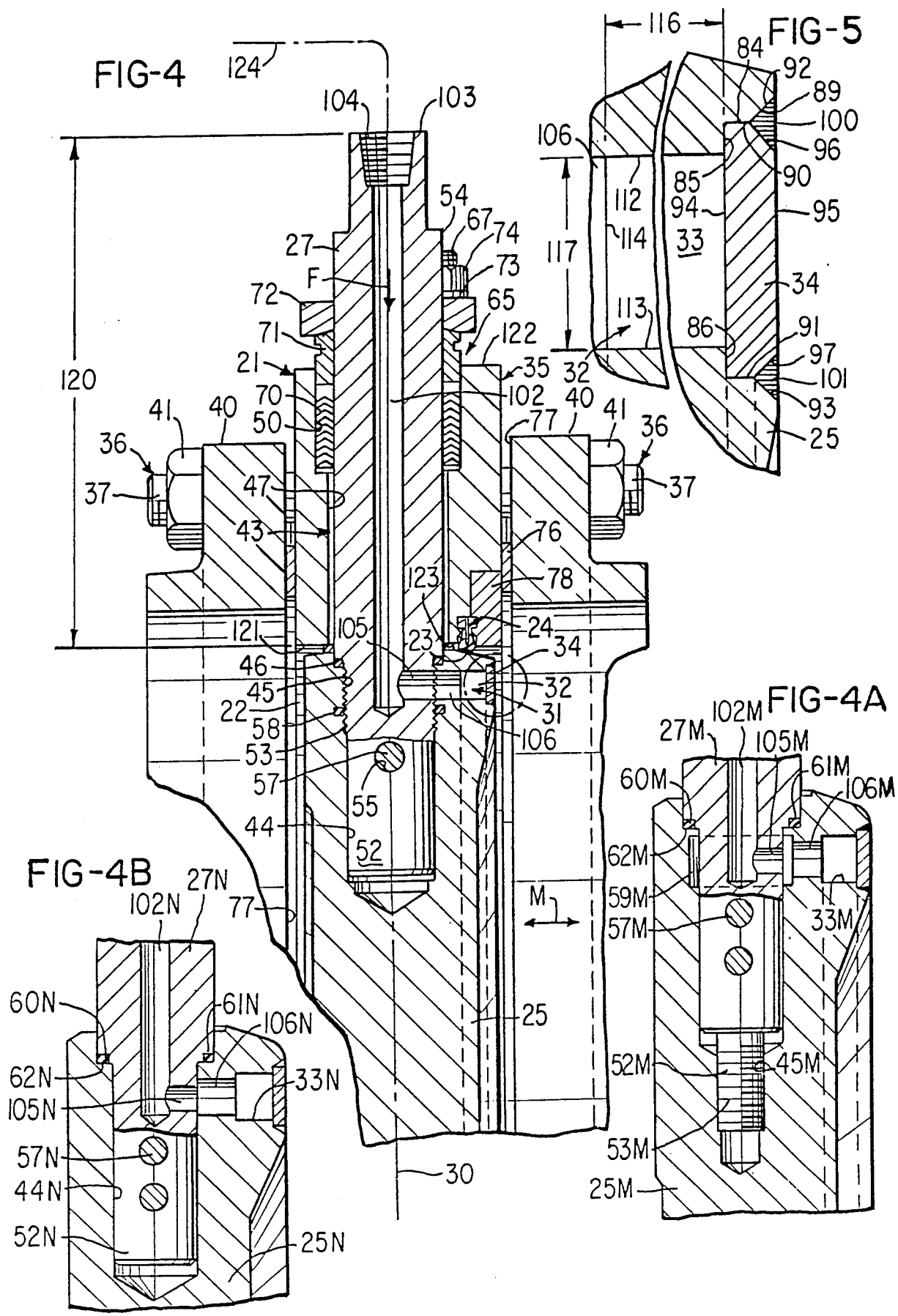

VALVE AND METHOD OF MAKING SAME

This is a division of application Ser. No. 473,555 filed Mar. 9, 1983, now U.S. Pat. No. 4,559,967, issued Dec. 24, 1985.

BACKGROUND OF THE INVENTION

1. Field of the Invention

This invention relates to valves and in particular to a fluid control valve and method of making same.

2. Description of the Prior Art

It is known in the art to provide fluid control valves each comprising a valve body structure having a fluid flow passage therethrough and first sealing surface means, and a closure structure for controlling fluid flow through the passage with the closure structure having a second sealing surface means adapted to engage the first sealing surface means to shut off fluid flow through the associated valve.

However, some of the known fluid control valves are often used to control flow of fluids wherein a particular fluid is at such a temperature that there is a tendency to reduce or weaken the structural integrity of its associated valve. Others of such known fluid control valves are used to control fluids containing particles, or the like, which tend to accumulate or build up on the sealing surface means comprising the valve body structure and/or the valve closure structure of the associated valve. The accumulated particles on such sealing surface means teand to impair the sealing action of the overall valve or tend to cause premature failure of the associated component and/or any component cooperating or associated therewith due to the abrading tendency of the material accumulated on the associated sealing surface means. Accordingly, the control valves mentioned have the indicated deficiencies.

In an effort to solve the above-mentioned problems various valves have been proposed heretofore. In particular, one such valve, in the form of a butterfly valve, is disclosed in U.S. Pat. No. 4,289,296. The valve of this patent utilizes a so-called bidirectional axially pliant pressure assisted seat.

Another previously proposed valve, also in the form of a butterfly vlave, employs a closure member which has a hollow cavity between two roughly parallel facing cup-shaped discs comprising such closure member. The cavity is adapted to receive a fluid therein for heating the entire disc to prevent any accumulation on the sealing surfaces thereof of any material contained in the fluid being controlled by the valve.

Finally, other previously proposed valves have been provided with jackets completely therearound for the purpose of either heating or cooling same, as desired, to thereby control accumulations on the sealing surfaces thereof and/or control the structural integrity of such valves.

However, the valves proposed heretofore, including each of the valves specifically mentioned above, are basically deficient in that the control of the temperatures of the sealing surface means thereof is not provided with optimum efficiency.

SUMMARY OF THE INVENTION

This invention provides an improved fluid control valve which comprises a valve body structure having a fluid flow passage therethrough and first sealing surface means anc a closure structure for controlling fluid flow through the passage with the closure structure having second sealing surface means adapted to engage the first sealing surface means to shut off fluid flow through the valve and wherein such fluid control valve overcomes the above-mentioned deficiencies.

In accordance with one embodiment of the improved valve of this invention such valve comprises substantially annular heat exchange means comprising at least one of the structures and being disposed immediately adjacent the sealing surface means thereof for controlling the temperature of at least one of the sealing surface means.

Accordingly, it is an object of this invention to provide an improved fluid control valve of the character mentioned.

Another object of this invention is to provide an improved method of making a fluid control valve of the character mentioned.

Other features, objects, uses, and advantages of this invention are apparent from a reading of this description which proceeds with reference to the accompanying drawings forming a part thereof.

BRIEF DESCRIPTION OF THE DRAWINGS

The accompanying drawings show present preferred embodiments of this invention, in which FIG. 1 is an isometric view illustrating one exemplary embodiment of a fluid control valve of this invention in the form of a butterfly valve and showing the closure structure or member thereof for such butterfly valve in a closed position;

FIG. 2 is an isometric view showing only the butterfly valve closure structure of the valve of FIG. 1 and with a portion of such closure structure exploded away;

FIG. 3 is an enlarged view of the valve of FIG. 1 looking perpendicularly toward its closed closure structure and with parts in elevation, parts broken away, and parts in cross section;

FIG. 4 is a further enlarged primarily cross-sectional view of the upper portion of the valve of FIG. 1 taken essentially on the line 4—4 of FIG. 1;

FIG. 4A is a fragmentary view similar to the central portion of FIG. 4 illustrating modification of the valve stem to disc attachment and fluid seal means therebetween;

FIG. 4B is a view similar to FIG. 4A illustrating another modification;

FIG. 5 is a greatly enlarged cross-sectional view of that portion of the valve shown within the dot-dash circle illustrated in the central part of FIG. 4;

DETAILED DESCRIPTION

Figure 6:
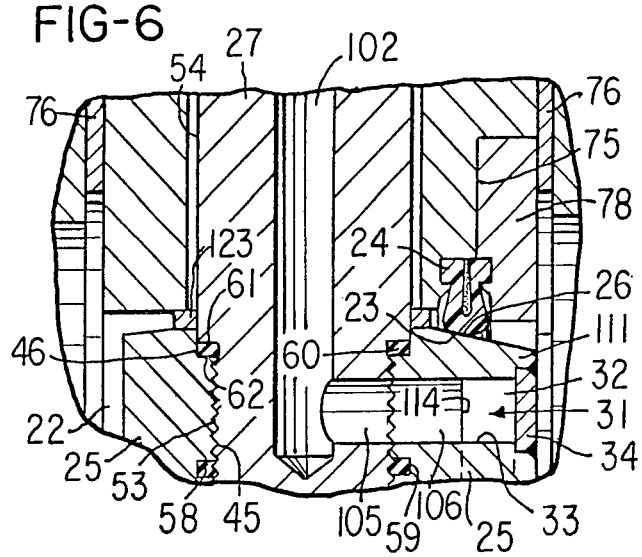
FIG. 6 is a view with various parts broken away and drawn to a scale which is much larger than the scale of the illustration of FIG. 4, showing primarily the areas around the sealing surface means of the valve body structure and the valve closure structure.

Reference is now made to FIG. 1 of the drawings which illustrates one exemplary embodiment of a fluid control valve of this invention, which is in the form of a butterfly valve, and such valve is designated generally by the reference numeral 20. The exemplary valve 20 is basically a valve of the type illustrated in the above-mentioned U.S. Pat. No. 4,289,296 and the disclosure of this patent is incorporated herein by reference thereto. However, it is to be understood that the inventive concept of this invention is fully applicable not only to butterfly valves, and in particular to butterfly valves of the type disclosed in the above patent, but also to numerous other types of valves including, but not being limited to, ball valves, plug valves, gate valves, and the like.

The valve 20 is particularly adapted to be used to control the flow of fluid therethrough wherein such fluid M has a tendency, either due to the temperature thereof or due to such fluid itself and its constituents, to cause degradation of such valve and/or its components. It will be appreciated that degradation due to temperature of the fluid being controlled may cause structural weakness of one or more valve components. Similarly, degradation due to the fluid itself and/or its constituents may result in a buildup of undesired material on the cooperating sealing surface means or sealing surfaces of the valve 20. The buildup of undesired material may cause an abrading action during opening and closing of the valve 20 and subsequent failure of abraded components. In addition, such buildup may prevent good sealing between cooperating sealing surfaces of the valve and hence premature failure. However, regardless of the degradation action to which the improved valve 20 of this invention is subjected, such valve provides improved performance for reasons which will be apparent from the following description.

Referring now to FIGS. 1 and 4 of the drawings it is seen that the valve 20 comprises a valve body structure which is designated generally by the reference numeral 21; and, in this example is of so-called wafer construction. The body structure 21 has a fluid flow passage 22 therethrough (FIG. 6) and first sealing surface means in the form of a sealing surface 23 which is provided on a sealing member 24.

The valve 20 also has a closure structure or member in the form of a closure disc 25, of circular outline, for controlling fluid flow through the flow passage 22 and the closure structure or disc 25 has second sealing surface means in the form of a sealing surface 26 which is adapted to engage the first sealing surface means or sealing surface 23 to shut off fluid flow through the valve 20. The sealing surface 26 is provided in the disc 25 about the periphery thereof and such disc is mounted for partial rotation or pivotal movement within the passage 22 to open and close the valve.

The disc 25 is mounted in the body structure 21 (FIG. 4) employing a pair of stems 27 which are disposed at a diametral position of the disc and have their axes coinciding with an axis 30 which is common thereto. The stems 27 are detachably fixed to the disc 25 in a manner to be subsequently described so that upon rotating at least one of the stems utilizing any suitable manual, automatic, or semi-automatic means the disc 25 is pivotally moved between open and closed positions defining open and closed positions of the valve. The disc 25 may also be moved to any desired intermediate position between its open and closed position.

The disc 25 is disposed with respect to its axis and hence the common axis 30 of the stems 27 so that such disc is eccentric or offset in two mutually perpendicular directions with respect to axis 30 in a manner which is well known in the art of butterfly valves and for purposes which are also well known and thus will not be described in detail herein. The two eccentricities, in essence, provide a cam-like action to the movement of the disc 25 as it is povited between fully open and fully closed positions whereby the disc 25 is not subjected to a constant scrubbing of the valve sealing surfaces and thereby is free of excessive disc drag and sealing surface deformation for well known reasons and such reasions will not be repeated herein.

However, in accordance with this invention and as best illustrated in FIG. 4 of the drawings, the valve 20 comprises substantially annular heat exchange means which is designated genearlly by the reference numeral 31 and such heat exchange means comprises at least one of the structures, either 21 or 25, and is disposed immediately adjacent the sealing surface means thereof for controlling the temperature of at least one of the sealing surface means. In this example of the invention and as also seen in FIG. 6 the heat exchange means 31 is provided in the closure structure or disc 25 immediately adjacent sealing surface 26 for controlling the temperature of such sealing surface. Accordingly, with the closure structure or disc 25 in any position from fully open to fully closed and at all intermediate positions the heat exchange means is capable of providing a controlled temperature as will be subsequently described.

Each sealing surface means or sealing surface 23 and 26 in this example of the invention is a substantially annular sealing surface and as will be readily apparent from the drawings each annular sealing surface is a substantially continuous sealing surface as well. It will also be seen that the substantially annular heat exchange means 31 (FIGS. 4 through 6) comprises annular conduit means 32 for conveying a heat transfer fluid and such conduit means comprises a substantially annular groove 33 in the disc 25 and an annular plate 34 fixed in sealed relation over the groove 33.

Referring particularly to FIG. 4 of the drawings, it is seen that the valve body structure 21 comprises a main body 35 which has studs 36 suitably threaded therein on opposite sides thereof. Each stud has an inner portion threaded in the main body 35 and an outer portion provided with threads 37. The studs 36 on each side of the main body 35 are provided on a common circumference and the studs on each side are also adapted to be extended through associated openings in a flange 40 comprising an associated pipe structure or system in which the valve 20 is used. Once each flange 40 is in position for fastening to the valve 20, threaded nuts 41 are threaded over the threads 37 to fasten the main body 35 and hence the overall valve 20 in the pipe system.

As previously mentioned, the closure structure or disc 25 is suitably pivotally fastened in the body structure 21 utilizing the stems 27. The stems 27 and their component parts are substantially identical whereby the reference numeral 27 is fully applicable to each. In view of this the detailed description will proceed with the description of the upper stem and its components, as best shown in FIGS. 4 and 5, with it being understood that such description of the upper stem 27 and its components is fully applicable to the lower stem 27 and its components.

Each stem 27 is disposed in an associated bore means 43 which extends through an associated portion of the body structure 21 and an associated bore means or bore 44 in an associated portion of the disc 25. In particular, it will be seen that each bore 44 is provided in a peripheral part of the disc 25 and such bore has a threaded portion 45. Each bore 44 and its threaded portion 45 are disposed on a common axis coinciding with the axis 30;

and, a counterbore 46 is provided outwardly of the threaded portion 45 of bore 44.

Each bore means 43 in the body structure 21 comprises a bore 47 in an associated part of the main body 35 of the body structure 21 and has a counterbore 50. The bore 44, threaded portion 45, counterbore 46, bore 47, and counterbore 50 associated with each stem 27 have axes which are common with and coincide with the axis 30.

Each stem 27 has an inner part 52 which is adapted to be received within its bore 44 in non-interfering relation with the surface defining such bore; and, each stem 27 has a threaded part 53 which is threadedly received within the threaded part 45 of its associated bore 44. In addition, each stem 27 has a larger diameter cylindrical outer portion 54 provided with an annular shoulder 61 (FIG. 6) between its threaded portion 53 and outer portion 54. Each stem 27 also has a bore 55 (FIG. 3) which is aligned with a corresponding bore 56 in the disc 25 and receives an associated pin 57 therethrough. Each pin 57, in essence, locks an associated stem 27 to the disc 25 and thereby prevents rotational movements of the stem as well as axial movements of such stem realative to the disc 25.

Referring now to FIG. 6 it is seen that to provide a fluid-tight seal between the inner part of each stem 27 and the disc 25 an annular polymeric sealing ring 58 is disposed within a corresponding annular groove 59 in the disc and such ring 58 and groove 59 have central axes which coincide with the axis 30. The sealing ring 58 engages the threaded part 53 of the stem 53. In addition, it will be seen that a second annular polymeric sealing ring 60 is disposed between an annular shoulder 61 on an associated stem 27 and a cooperating annular surface 62 defined by an associated counterbore 46 and such ring 60 has an axis which coincides with the axis 30. Each ring 60 engages its associated stem 27 at the base of its threaded part 53. In this manner, each set of rings 58 and 60 provides a fluid-tight seal between the disc 25 and the stem 27 associated therewith while assuring that fluid passages in the associated stem 27 and disc 25 communicating with annular conduit means 32 associated with such stem are capable of providing fluid to such conduit means 32 without fluid leakage out of such stem and disc.

As best seen in FIGS. 3 and 4 the valve 20 also has means 65 for providnig a seal between each stem 27 and the main body 35 of the valve body structure 21. Each sealing means 65 comprises a plurality of two studs 66 having inner end portions threaded within the main body 35 and having threaded outer ends 67. Each sealing means 65 also comprises packing means comprising a plurality of axially stacked so-called chevron packing rings 70 which are disposed within the counterbore 50, and a follower ring or follower 71.

Each follower 71 has an inner end which engages the outermost one of the chevron rings 70 and an outer end which is adapted to be engaged by what will be referred to as a stop follower 72. Each stop follower 72 had a pair of openings which receive the threaded outer ends 67 of its associated studs 66 therethrough and washers 73 are disposed around the threaded outer portions 67. A pair of threaded nuts 74 are provided and threaded over the threaded outer portions 67 of the studs 66.

With the above-described components of each sealing means 65 it is a simple matter to prevent any possible leakage of fluid from within the valve 20 and axially along an associated stem 27. This is achieved by threading associated nuts 74 along the threaded portions 67 of associated studs 66 urging the associated washers 73, stop follower 72, and follower 71 against associated chevron packing rings 70. This urging controls the physical deformation of such rings 70 and thereby the engagement of such rings 70 with its stem 27 and adjoining part of the main body 35, as is known in the art, to thereby prevent any possible leakage from around the outside surface of such stem 27.

In this disclosure of the invention, a sealing member 24 has been illustrated and described as being carried by the main body 35 of the valve body structure 21; and, such sealing member 24 is illustrated as being of a particular configuration. However, it is to be understood that such sealing member may be of any suitable configuration which is known in the art and typical configurations are illustrated in the above-mentioned U.S. Pat. No. 4,289,296. Likewise, the sealing member 24, regardless of its configuration may be made of suitable material or materials as known in the art which may include metallic and/or nonmetallic materials.

The member 24 is preferably detachably fixed in position using any suitable means; and as seen in FIGS. 3, 4, and 6, in this example a retainer ring 78 is used for this purpose. The ring 78 is disposed within a cooperating substantially annular cutout 75 in the main body 35 of the body structure 21; and, such ring 78 is suitably fixed in position by any suitable fastening means. The ring 78 is preferably fixed in position by a plurality of threaded fastening screws 79.

The valve 20 is also provided with suitable seal means or a seal between each end or side of the main body 35 of the body structure 21 and an associated flange 40. In this example, a sealing ring 76 is disposed in sandwiched relation between the inside surface 77 of each flange 40 and associated outside surface means of the main body 35. Each sealing ring 76 may be made of any suitable material known in the art so as to provide the desired sealing function.

Having described the main structural components of the valve 20, the detailed description will now proceed with a detailed description of the substantially annular heat exchange means 31 and for this description particular reference is made to FIGS. 4, 5, and 6. As previously mentioned, the substantially annular heat exchange means 31 comprises conduit means 32 in the disc 25 in the form of subtantially annular groove means or a groove 33 and the annular plate 34 which is suitably fixed in sealed relation over the groove 33.

The annular groove 33 has an annular counterbore 84 which defines an outer comparatively large diameter annular planar surface 85 and an inner comparatively smaller diameter annular planar surface 86. The annular surfaces 85 and 86 are substantially coplanar and surface 85 is adjoined by cylindrical surface 90 while surface 86 is adjoined by cylindrical surface 91. An annular countersink 89 is also provided outwardly of the annular counterbore 84 and such countersink defines a large diameter substantially frustoconical surface 92 adjoingin cylindrical surface 90 and a similar substantially smaller diameter frustoconical surface 93 adjoining surface 91.

It will also be seen that the annular plate 34 has a pair of parallel surfaces 94 and 95 with the surface 94 being disposed against the coplanar surfaces 85 and 86 and the surface 95 being substantially coplanar with the outer large diameter edges of the frustoconical surfaces 92 and 93. The plate 34 also has a pair of outer frustoconical surfaces 96 and 97 comprising the outer edges thereof.

The annular plate 34 is adapted to be installed in position in the annular counterbore and once such plate 34 is installed in position, the dimensions of such plate 34, annular groove 33, annular counterbore 84, and annular countersink 89 defining frustoconical surfaces 92 and 93 are such that an inner and an outer annular channel or cutout of triangular cross section are defined. The outer annular cutout of triangular cross section is defined by cooperating frustoconical surfacew 92 and 96, and the inner annular cutout of triangular cross section is defined by frustoconical surfaces 93 and 97.

The plate 34 is fixed in position in sealed relation by a pair of annular welds 100 and 101. Weld 100 is disposed and fixed in sealed relation against the surfaces 92 and 96; and similarly the weld 101 is disposed and fixed in sealed relation against the surfaces 93 and 97.

The substantially annular heat exchange means 31 in this exemplary embodiment of the invention is provided in the form of annular heat exchange means for circulating a heat transfer fluid F. Accordingly, means is provided for providing such heat transfer fluid F to the annular heat exchange means 31 and removing same therefrom, as illustrated in FIGS. 3 and 4. The actual structural components and means associated with each stem 27 for providing fluid F to the heat exchange means 31 and removing such fluid F from the heat exchange means are substantially identical. Therefeore, the detailed description will proceed with only a description of the components and means for supplying fluid F to the top or upper stem 27 with it being understood that such fluid exits the bottom or lower stem 27 through substantially identical components and means also communicating with the heat exchange means 31. Actually the flow of heat transfer fluid may be reversed, if desired, by providing such fluid into and through the bottom or lower stem 27, through the substantially annular heat exchange means 31, and out of the top or upper stem 27.

Each stem 27 has an axial bore 102 which extends the major part of the axial length thereof from an outer surface 103 thereof inwardly and axially therealong to a location just short of the bore 55 in the inner portion of such stem 27. A threaded inlet 104 is provided to the axial passage 102 in each stem 27 for the purpose of threading a connector of a fluid conduit which is to be placed in fluid communication with the passage 102.

Each stem 27 also has a cross bore 105 disposed substantially perpendicular to the axis 30 and communicating with the terminal inner end portion of the bore 102; and such cross bore 105 is disposed so that with the stem 27 installed in its desired position the cross bore is located between the annular seals 58 and 60. The cross bore 105 of each stem 27 is constructed, arranged, and dimensionally disposed such that it communicates with a cooperating cross bore 106 in the closure structure or disc 25. Each cross bore 106 communicates with the inner portion of the groove 33.

Thus, heat transfer fluid, such as a suitable heat transfer liquid F, is introduced under positive pressure into the bore 102 of the upper stem and such fluid flows through the aligned cross bores 105 and 106 into the groove 33 defining the substantially annular conduit means 32 of the substantially annular heat exchange means. Once the heat transfer fluid F enters the conduit means 32 it flows in opposed directions as illustrated by arrows 107 and 108 in FIG. 3 whereby such flow is about the entire periphery of the dis 25. The fluid F then flows out of the conduit means 32 and flows through cross bore 106 in the lower portion of the disc 25, associated aligned cross bore 105 in the lower stem 27, and associated axial bore 102 in such lower stem 27. The fluid F then exits the lower valve stem 27 as illustrated at 110 in FIG. 3.

The substantially annular heat exchange means 31 is provided with precise dimensional placement in the outer peripheral portion 111 of the disc 25 such that heat transfer fluid F is in very close proximity to the second sealing surface means or the sealing surface 26 of such disc 25. This placement of the annular heat exchange means 31 assures precise control of the temperature of the sealing surface means or surface 26. Obviously, this is possible because the temperature, flow rate, and heat transfer characteristics of the fluid F can be controlled with great precision as is known in the art.

With the structure described above, it is possible to control the temperature of the sealing surface means or sealing surface 26 in instances where it is desired to cool or heat the sealing surface 26. Accordingly, in those instances where the temperature of the fluid or fluid media M flowing through the valve 20 is such that particles in or of such media tend to accumulate on the sealing surface 26, the temperature of fluid F is controlled to a higher level causing a controlled heating of the sealing surface 26. This heating assures that particles or portions of the material will not accumulate on the outer sealing surface 26 by, in essence, being heated so as to flow away therefrom. In this manner, a smooth fluid-tight sealing action is provided once the surface 26 engages the sealing surface 23. This sealing action is also achieved in a non-sticking and non-abrading manner. For example, in an application where the fluid media M contains sulphur there in minimum tendency for any of such sulphur to condense or accumulate on the sealing surface 26 and cause poor sealing and/or an abrading action.

It will also be appreciated that in many applications the temperature of the fluid media M being controlled by the valve 20 is such that it may be desirable to circulate a substantially cooler fluid F through the annular heat exchange means to cool the sealing surface and protect the structural integrity thereof and/or prevent accumulation of particles from the fluid media thereon.

The substantially annular conduit means 32 of the substantially annular heat exchange means 31 has controlled surfaces and such controlled surfaces are precisely located as previously described. In addition, such surfaces assure optimum heat transfer between the heat transfer fluid F and substantially the outer peripheral portion 111 of the disc 25 and hence the sealing surface 26 of such disc.

In this example, the controlled surfaces of the substantially annular conduit means 32 are defined by opposed cylindrical surfaces 112 and 113 of the substantially annular groove 33 together with a surface 114 defining the bottom of such groove 33 and inside surface 94 of the plate 34 - FIG. 5.

Having described the various component portions of the valve 20, the detailed description will now proceed with the preferred manner of defining the substantially annular heat exchange means 31 in such valve 20 and in particular the annular conduit means 32 thereof and the fluid passage means communicating with the annular conduit means 32. In particular, the annular cavity or groove 33 is preferably machines in the face of the disc 25 utilizing suitable machining tools as it known in the art. The machining operation is a simple turning operation and it will be appreciated that the placement of the groove 33 may be in close proximity to the sealing surface 26 without affecting the structural integrity of sealing surface 26 in a detrimental manner.

The machining operation to define the annular groove 33 is precisely controlled by tool operation so as to define a controlled depth 116 in such groove while controlling the radial length 117 thereof. The depth 116, radial length 117, surface finish of the surfaces defined thereby, etc., will at least in part be influenced by the temperature desired to be imparted to the outer peripheral portion 111 of the disc. In addition, the mass of the disc, the temperature of the fluid media M, and the type and temperature of the fluid F provided for heat transfer purposes will all be considered in machining such groove 33 as well as in defining the surface finish of surface 94 in the plate 34.

Having machined the annular groove 33, an annular counterbore 84 is defined in the peripheral outer edge of the annular groove 33 followed by an annular countersunk portion 89. The annular groove 33, annular counterbore 84, and annular countersink 89 are all defined by simple turning operations. Once these turning operations have been completed the plate 34 is made as is known in the art, including the frustoconical surfaces 96 and 97 thereof, whereupon such plate 34 is fixed in position in sealed relation by annular welds 100 and 101.

However, it will be appreciated that the fixing of the plate 34 in position in sealed relation in the annular groove 33 may be achieved by simply holding the plate 34 in position utilizing threaded fastening bolts and suitable sealing means between the plate and disc 25. Because such fastening bolts and sealing gasket means are well known in the art they will not be illustrated or described further. However, regardless of how the plate 34 is fixed in position in sealed relation over the annular groove 33, the key to the provision of a precisely controlled temperature on the sealing surface 26 is the provision of heat transfer means in a precise manner closely adjacent such sealing surface 26.

Prior to fixing the plate 34 in sealed relation against the disc 25, either by welding or other means, the two diametrically arranged cross bores 106 are provided such that they communicate with the annular groove 33. The means for placing the heat transfer fluid F in fluid communication with the annular conduit means 32, in addition to the cross bores 106, comprises an axial bore 102 in each stem and each bore 102 has a threaded outer portion 104. Each axial bore 102 and threaded outer portion 104 is provided utilizing any suitable technique known in the art.

Once an axial bore 102 and its threaded outer portion 104 are provided in an associated stem 27 the cross bore 105 is provided therein so that it communicates with the inner end portion of such axial bore 102. The precise axial location of the cross bore 105 is determined by taking into consideration the various dimensions of the cooperating parts of the valve 20 together with dimensional tolerances thereof whereby the cross bore 105 is precisely located.

The radial position of the cross bore is also marked on the outer surface 103 so that during installation of a stem 27 it is a comparatively simple matter to align its cross bore 105 with the cross bore 106 associated therewith.

The amount that each stem 27 is threaded in position in the threaded part 45 of the bore 44 is determined by precise measurement of the dimension 120 from a fixed surface 121 on the main body 35 of the body structure 21 and the outer surface 103 of the associated stem. This measurement may be achieved utilizing any suitable measuring device known in the art.

It will be appreciated that once each stem 27 is threaded in position, the annular seals 58 and 60 associated therewith provide their sealing function. During threading of each stem 27, its associated seal 60 serves as a resilient axially deformable member of annular construction which compensates for any dimensional variations in the associated parts. It will also be seen that by providing a suitable mark on the outer surface 103 to indicate the radial position of the cross bore 105 and a corresponding mark on a readily visable fixed surface such as a surface 122 of the main body 35, it is a simple matter to visually align the cross bores 105 and 106 with the axial positioning thereof along the axis 30 being determined by the dimension 120.

The installation and placement of the disc 25 within the main body 35 are aided by annular disc spacers 123. The disc spacers 123 serve to locate the disc 25 along the axis 30 yet within the main body 35 and also serve as thrust bearings for such disc.

To aid in the precise axial positioning of the disc 25 the threaded portion 45 in the bore 44 has what may be considered extremely fine threads. Likewise, the threaded part 53 in each stem 27 has cooperating extremely fine threads. Accordingly, once action is taken to thread the stem 27 in position a more precise axial positioning may be achieved with the threading action.

To assure that the valve 20 may be operated by rotating either one or both actuating stems 27 thereof without interfering with the provision of heat transfer fluid F to and through such valve 20, suitable flexible conduits, such as braided metal conduits lined with a suitable polymeric material, for example, may be connected by suitable connectors (not shown) to the threaded outer portios or ends 104 of the bores 102. These flexible conduits are shown schematically by dot-dash lines and are each designated by the same reference numeral 124.

Other exemplary embodiments of the valve of this invention are illustrated in the fragmentary views presented in FIGS. 7, 8, 9, 10, and 11. The valves illustrated in FIGS. 7, 8, 9, 10, and 11 are very similar to the valve 20; therefore, such valves will be designated generally by the reference numerals 20A, 20B, 20C, 20D, and 20E respectively and representative parts of each valve which are similar to corresponding parts of the valve 20 will be designated in the drawings by the same reference numerals as in the valve 20 (whether or not such representative parts are mentioned in the specification) followed by the associated letter designation either A, B, C, D, or E and not described again in detail. Only those component parts of each valve of FIGS. 7, 8, 9, 10, and 11 which are substantially different from corresponding parts of the valve 20 will be designated by a new reference numeral also followed by the associated letter designation and described in detail.

Figure 7:
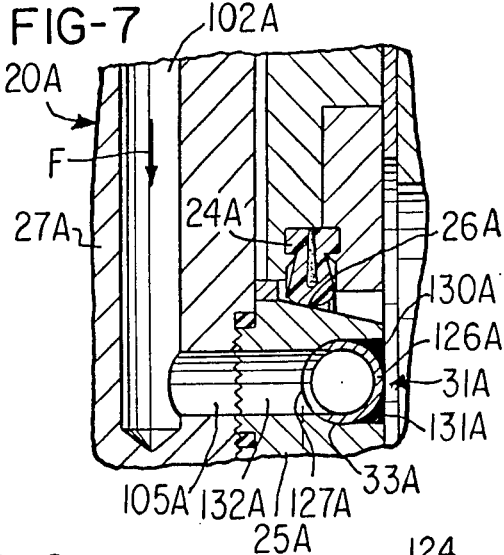
FIGS. 7, 8, 9, 10, and 11 are fragmentary views primarily in cross section, and with certain parts in some FIGS. shown schematically, of other exemplary embodiments of the valve of this invention.

The valve 20A of FIG. 7 instead of having annular conduit means 32 comprising an annular plate over an annular groove which defines substantially annular heat exchange means comprises a substantially toroidal conduit 126A suitably disposed in an annular groove 33A. The groove 33A has a semi-toroidal surface 127A defining its bottom or inside surface and the conduit 126A is disposed against surface 127A and welded in sealed relation by annular welds 130A and 131A. The disc 25A of valve 20A has a cross bore 132A communicating with a cross bore 105A in the stem 27A.

The operation of the valve 20A is substantially identical to the operation of the valve 20. Further, the heating or cooling of the sealing surface 26A and adjacent structures is achieved by the circulation of heat transfer fluid F through the conduit 126A comprising the annular heat exchange means 31A of the valve 20A.

Figure 8:
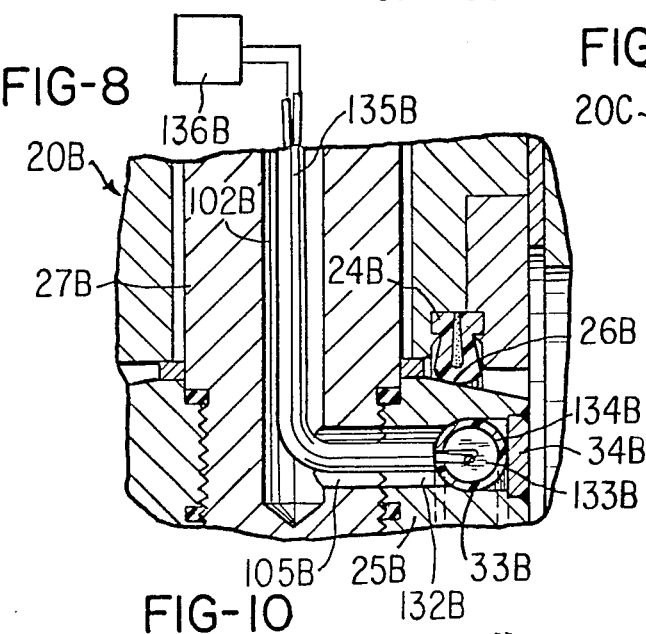

The valve 20B of FIG. 8 instead of providing substantially annular heat exchange means adapted to flow a heat transfer fluid therethrough for heating and/or cooling purposes comprises a substantially annular groove means or groove 33B in the disc 25B and electrical means in the form of a suitable electrical heater 133B is provided with suitable electrical insulation 134B therearound and is provided with electrical power through electrically insulated leads 135B suitably connected to the heater 133B at one end and to a source of electrical power 136B, indicated schematically, at the opposite end. The leads 135B extend through an axial bore 102B in the stem 27B and aligned cross bores 105B and 132B in the stem 27B and disc 25B respectively.

The heater 133B may be supported and held in position using any suitable technique known in the art; however, in this example, such heater is held in position by an annular plate 34B which is suitably fastened to the disc 25B.

Thus, it is seen that the substantially annular heat exchange means of the valve 20B is an electrical heater 133B capable of providing heating of the sealing surface 26B within a precise temperature range. Such controlled heating assures that undesirable accumulations of material comprising the fluid media M will not occur on the sealing surface 26B.

Because the valve 20B is heated by electrical means and not by a fluid, it is only necessary to extend the electrical leads through only one stem 27B as shown. The other stem of such valve may be as taught in the above-mentioned U.S. Pat. No. 4,289,296, for example.

Figure 9:
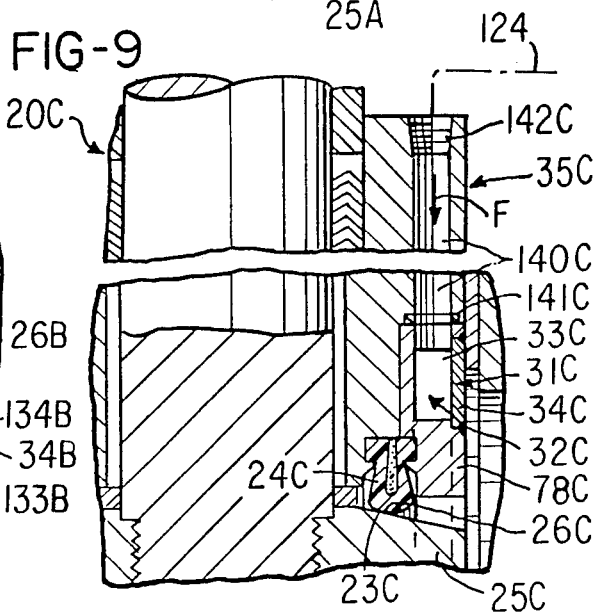

The valve 20C of FIG. 9 comprises substantially annular heat exchange means 31C in the main body structure and in particular the ring 78C comprising the main body 35C. The annular heat exchange means 31C comprises an annular groove 33C in the ring 78C and an annular plate 34C fixed in sealed relation, as by suitable annular welds, over the annular groove 33C. The groove 33C and plate 34C define annular conduit means 32C.

The annular conduit means 32C has a pair of radial passages or bores 140C each of which extends through the ring 78C and the adjoining part of the main body 35C with a seal 141C therebetween. Each bore 140C has a threaded outer part 142C for receiving a suitable conduit 124 which is again shown schematically by dot-dash lines as in the valve 20.

The above construction of the valve 20C enables a heat transfer fluid F to be introduced through one passage or bore 140C and discharged through an opposite diametrically arranged passage or bore 140C, not shown. The fluid F in the valve 20C may be used for heating or cooling purposes. Basically, such fluid F controls the temperature of the body structure or main body 35C within a precisely controlled range in an annulus immediately adjacent the sealing surface 23C. This precise control of the temperature of the body 35C adjacent the sealing surface 23C results in heat transfer to member 24C and to its sealing surface 23C whereby precise control of the temperature of surface 26C of disc 25C is also provided. The efficiency of heat transfer across member 24C will be influenced by the heat transfer characteristics of such member.

The annular conduit means 32C of this example is provided in the ring portion 78C of the main body 35C; however, it will be appreciated that conduit means 32C may be provided in any desired part of such main body. Also, by providing such annular conduit 32C in the ring 78C, it will be appreciated that fastening screws, or the like, used to fasten such ring in position are disposed so that they do not extend through the annular conduit means 32C.

It will also be appreciated that except for the above-described differences, the valve 20C is very similar to the valve of the above-mentioned U.S. Pat. No. 4,289,296.

Figure 10:
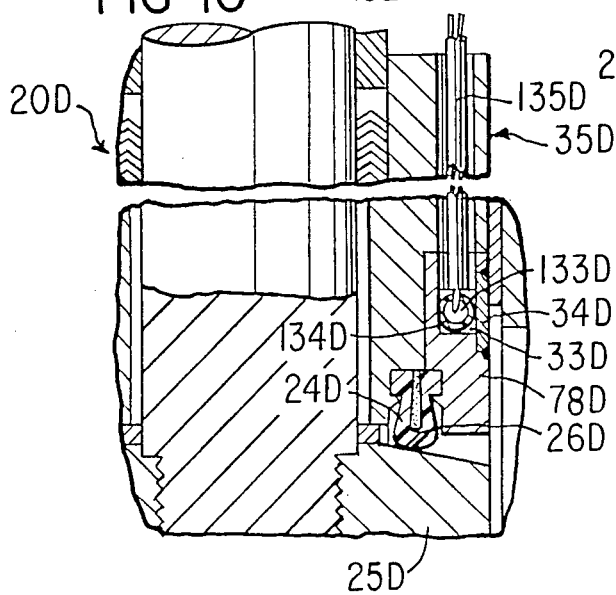

The valve 20D of FIG. 10 instead of providing substantially annular heat exchange means adapted to flow a heat transfer fluid therethrough for heating and/or cooling purposes comprises a substantially annular groove means or groove 33D in the ring 78D of the main body 35D. The groove 33D has electrical means in the form of an electrical heater 133D disposed therein and suitably held in position using an annular plate 34D.

The heater 133D is supplied with electrical power through insulated electrical leads 135D. In addition, suitable electrical insulation 134D is provided around the heater 133D.

The heater 133D provides heating similar to the heating provided by the heater 133B of the valve 20B. In addition, the transfer of heat is from the main body 35D across the seal which is similar to seal 24C of FIG. 9. It will also be appreciated that except for the electrical heater 133D and associated structure the construction and operation of the valve 20D is similar to the valve disclosed in U.S. Pat. No. 4,289,296.

Figure 11:
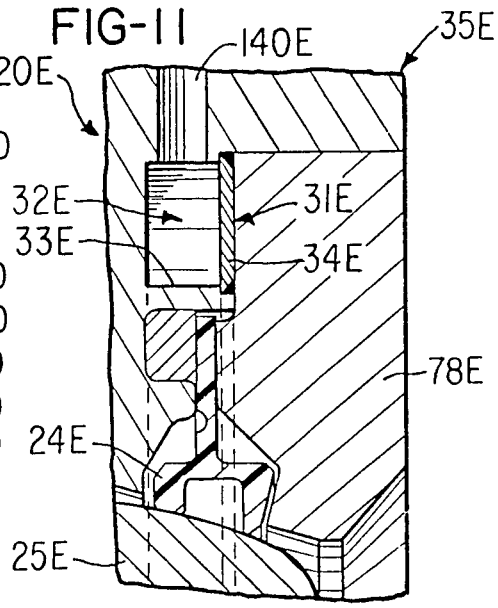

The valve 20E of FIG. 11 comprises substantially annular heat exchange means 31E in the inner part of the main body 35E spaced inwardly from the retainer ring 78E thereof and such placement in some applications, and depending on the construction and configuration of the sealing member, may provide better heat transfer to a sealing surface desired to be heated. The heat exchange means 31E comprises an annular groove 33E in body 35E and an annular cover plate 34E fixed in sealed relation, as by welding over the groove 33E to define annular conduit means 32E.

The annular conduit means 32E has a pair of passages or bores 140E communicating therewith and each bore 140E extends through the main body 35E and exits therefrom. Each bore 140E may be a radial bore from the conduit means 32E or each bore may have a radial portion extending from the conduit means 32E and then have another portion extending transverse the radial portion.

The conduit means 32E is particularly adapted to flow a fluid F therethrough or such conduit means 32E may house an electrical heater or other heating means, such as electrical heating means, in a similar manner as valves 20B and 20D, for example.

In the exemplary embodiment of the invention illustrated in FIGS. 1 through 6 a particular means of attaching the stem 27 to the disc 25 has been illustrated wherein the stem 27 employs a threaded part 53 which functions as previously described; and, a particular stem to disc fluid seal means is also shown. Modifications of the stem to disc attachment and fluid seal means therebetween are illustrated in FIGS. 4A and 4B of the drawings and in these modifications, components or portions which are similar to those of FIGS. 1-6 will be designated by the same reference numerals as before followed by the letter M in the FIG. 4A illustration and followed by the letter N in the FIG. 4B illustration. If desired, the stem to disc attachment and fluid seal means of either FIG. 4A or FIG. 4B may be used in lieu of the stem to disc attachment and seal means of FIGS. 1-6.

In the modification of FIG. 4A, each stem 27M has an innermost portion 52M of reduced diameter which is provided with a threaded portion 53M. Threaded portion 53M is threadedly received in cooperating threaded portion 45M in the bore means of disc 25M. The threaded portions 45M and 53M function in a similar manner as threaded portions 45 and 53 and such description will not be repeated. In addition, a pin 57M is provided and used with each stem 27M in a similar manner as the previously described pin 57.

The fluid seal means between each stem 27M and disc 25M of FIG. 4A is comparatively simple and is provided by a polymeric sealing ring 60M which is compressed between annular shoulder 61M on the stem 27M and a cooperating annular surface 62M in the disc 25M. Each stem 27M has a cross bore 105M therein which communicates with one side of an associated one of a pair of annular grooves 59M in the disc 25M. The disc 27M also has a pair of cross bores 106M therein each of which communicates with the opposite side of an associated groove 59M; and, each cross bore 106M in turn communicates with an inner portion of groove 33M in disc 25M. The use of a groove 59M eliminates the need for precise alignment of cross bores 105M and 106M associated with each stem 27M. It will also be noted that each groove 59M has a central axis common with the axis of its associated stem 27M.

In the modification of FIG. 4B, the stem 27N is very simple and has a plain or unthreaded innermost portion 52N which is received within a plain blind bore means or bore 44N. A pin 57N is provided for holding the stem 27N and disc 25N together as well as preventing relative rotation therebetween, and such pin 57N is installed in position in a similar manner as the pin 57 previously described.

The fluid seal means between each stem 27N and disc 25N is also comparatively simple and, in a similar manner as in the disc 25M and stem 27M, is provided by polymeric sealing ring 60N which is compressed between an annular shoulder 61N on the stem 27N and a cooperating annular surface 62N in the disc 25N. Each stem 27N also has a cross bore 105N which communicates with an associated cross bore 106N in the disc 25N; and, each cross bore 106N in turn, communicates with an inner portion of groove 33N in the disc 25N.

Each exemplary valve 20, 20A, 20C and 20E may utilize a fluid F which is either a liquid, a gas, or mixture of liquid and gas for the purpose of providing controlled heating or cooling of its associated sealing surface means or sealing surface. In certain applications steam may be used for heating purposes. In this example, the sealing surface means or sealing surface is provided on the peripheral portion of the associated disc; however, it will be appreciated that the main effort and structure may be to provide controlled heating or cooling of a similar cooperating sealing surface of the main body of the valve, if desired.

The fluid F circulated through each valve of this invention which uses a fluid to control a sealing surface means may be provided from any suitable source (not shown) and preferably under pressure using a suitable pump, or the like. The fluid F is provided to the top stem and is discharged out of the bottom stem; however, this flow may be reversed, if desired. Further, the fluid F may be controlled in temperature using any suitable means for controlling the temperature of such fluid as is known in the art; and, the fluid F may be heated to a controlled temperature or cooled to a controlled temperature depending on the application.

Each valve 20 and 20A through 20E disclosed herein may be actuated by rotating or pivoting a stem thereof as is known in the art. Further, it may also be desirable to provide stops, or the like, (not shown) for limiting rotation of each stem and hence each disclosed valve and as is well known in the art.

The various seals, packing rings, and the like used in the valves 20 and 20A through 20E of this disclosure may be made of suitable materials known in the art provided that such materials are compatible with the construction of their associated valves, the temperature of the environment of each valve, and the temperature of the media M being controlled by each of such valves.

In this disclosure, fluid F has been described as being used in the valves 20 and 20A to control the temperature of sealing surface means thereof. However, it is to be understood that such fluid F is also used to control the temperature of the valve stems.

In this disclosure of the invention uas has been made of terms such as upper, lower, inner, outer, top, bottom, and the like. However, it is to be understood that these terms are used to describe each valve and various components thereof as illustrated in the drawings and such terms are not to be considered limiting in any way.

While present exemplary embodiments of this invention and methods of practicing the same, have been illustrated and described, it will be recognized that this invention may be otherwise variously embodied and practiced within the scope of the following claims.

What is claimed is:

1. In a fluid control butterfly valve comprising, a valve body structure having a fluid flow passage therethrough and first substantially annular sealing surface means around the periphery of said passage, and a rotatable closure structure for controlling fluid flow through said passage, said closure structure having second substantially annular sealing surface means around its periphery adapted to engage said first sealing surface means to shut off fluid flow through said valve, the improvement comprising substantially annual heat exchange means carried entirely by one of said structures and operating independently of the other of such structures, said annular heat exchange means corresponding in outline to and being disposed immediately adjacent yet in radially spaced relation with respect to an associated sealing surface means for controlling the temperature of at least its respective said associated sealing surface means, said substantially annular heat exchange means comprising electrical means, said substantially annular heat exchange means comprising substantially annular groove means in said one structure, said electrical means being disposed in said groove means, and further comprising an annular plate fastened over said annular groove means to hold said electrical means therein.

2. In a fluid control butterfly valve comprising, a valve body structure having a fluid flow passage therethrough and first substantially annular sealing surface means around the periphery of said passage, and a rotatable closure structure for controlling fluid flow through said passage, said closure structure having second substantially annular sealing surface means around its periphery adapted to engage said first sealing surface means to shut off fluid flow through said valve, the improvement comprising substantially annular heat exchange means carried entirely by one of said structures and operating independently of the other of such structures, said annular heat exchange means corresponding in outline to and being disposed immediately adjacent yet in radially spaced relation with respect to an associated sealing surface means for controlling the temperature of at least its respective said associated sealing surface means, said substantially annular heat exchange means comprising electrical means, said electrical means comprising an electrical heater, and said one structure being said closure structure.

3. A valve as set forth in claim 1 in which said one structure is said body structure, said body structure comprises a ring wherein said ring has annular groove means therein, said electrical means comprises an electrical heater, and said electrical heater is disposed in an electrically insulated manner in said groove means.

4. In a fluid control valve comprising, a valve body structure having a fluid flow passage therethrough and first sealing surface means, and a closure structure for controlling fluid flow through said passage, said closure structure having second sealing surface means adapted to engage said first sealing surface means to shut off fluid flow through said valve, the improvement comprising substantially annular heat exchange means carried entirely by said closure structure and operating independently of said body structure, said annular heat exchange means being disposed immediately adjacent said second sealing surface means for controlling the temperature of at least said second sealing surface means, and said annular heat exchange means comprising electrical means.

5. A valve as set forth in claim 4 in whic said electrical means comprises an electrical heater.

6. A valve as set forth in claim 5 in which said closure structure has annular groove means therein, and said electrical heater is disposed in an electrically insulated manner in said groove means.

7. A valve as set forth in claim 6 and further comprising an annular plate fastened to said closure structure over said annular groove means to hold said electrical heater therein.

8. A valve as set forth in claim 6 and further comprising electrically insulated leads connected to said heater at one end and to a source of electrical power at the other end.

9. A valve as set forth in claim 8 in the form of a butterfly valve.

* * * * *